(12) United States Patent
Slobodecki et al.

(10) Patent No.: US 8,038,167 B2
(45) Date of Patent: Oct. 18, 2011

(54) TWO STAGE HIGH RETENTION FASTENER

(75) Inventors: Jeffrey A. Slobodecki, Wales, MI (US);
Lynn M. Stanton, Northville, MI (US);
Jacob A. Siudym, II, Emmett, MI (US);
Daniel J. Lubera, Macomb, MI (US);
Matthew L. Kosiara, Emmett, MI (US)

(73) Assignee: Newfrey LLC, Newark, DE (US)

( * ) Notice: Subject to any disclaimer, the term of this patent is extended or adjusted under 35 U.S.C. 154(b) by 0 days.

(21) Appl. No.: 13/041,771

(22) Filed: Mar. 7, 2011

(65) Prior Publication Data
US 2011/0156377 A1    Jun. 30, 2011

Related U.S. Application Data

(62) Division of application No. 12/032,228, filed on Feb. 15, 2008, now Pat. No. 7,900,953.

(51) Int. Cl.
*B60R 21/20* (2011.01)
*A44B 17/00* (2006.01)
(52) U.S. Cl. ............ 280/728.2; 280/730.2; 24/293
(58) Field of Classification Search .......... 280/728.1, 280/728.2, 730.2, 753; 24/289, 292, 293, 24/294, 295, 457, 629, 633; 411/508, 509, 411/510, 913
See application file for complete search history.

(56) References Cited

U.S. PATENT DOCUMENTS

| 6,101,686 | A  | * | 8/2000 | Velthoven et al. | 24/295 |
| 6,431,584 | B1 | * | 8/2002 | Nagasawa et al. | 280/728.2 |
| 2001/0032377 | A1 | * | 10/2001 | Lubera et al. | 24/293 |
| 2005/0217082 | A1 | * | 10/2005 | Vassiliou | 24/294 |
| 2008/0028577 | A1 | * | 2/2008 | Soman et al. | 24/293 |

* cited by examiner

*Primary Examiner* — Paul N Dickson
*Assistant Examiner* — Joseph Rocca
(74) *Attorney, Agent, or Firm* — Michael P. Leary

(57) ABSTRACT

A fastener system for use with an air bag includes a fastener having a rounded base having a flat portion, and first and second arms oriented transverse to the flat portion. A first set of engagement devices is connected proximate the rounded base. A second set of engagement devices is connected spatially separated from both the first set and the rounded base. A vehicle component has a dog-house. The rounded base is received and engaged in a dog-house cavity connecting the fastener and vehicle component. The vehicle component displaces upon air bag deployment from a first engagement position having the first engagement device set engaged with a vehicle body panel, to a second engagement position having the second engagement device set engaged with the vehicle body panel. A second fastener sliding part allows telescopic extension of the vehicle component.

20 Claims, 15 Drawing Sheets

TWO STAGE HIGH RETENTION FASTENER

CROSS-REFERENCE TO RELATED APPLICATION

This application is a divisional of U.S. patent application Ser. No. 12/032,228, filed Feb. 15, 2008 all of which is incorporated herein by reference.

FIELD

The present disclosure relates to automobile fastener clips used to join components to a vehicle body.

BACKGROUND

The statements in this section merely provide background information related to the present disclosure and may not constitute prior art.

For automotive applications, fasteners are used to join trim or panel members to sections or metal body portions of the automobile. The requirements for these fasteners are that they be insertable into apertures of the automobile and meet requirements to both retain the component as well as provide a minimum pullout retention force such that the component is retained under given load conditions but can be removed without damaging the component. Common fastener designs include directly opposed flexible wings which deflect inwardly upon insertion of the fastener and expand by spring force to hold the fastener within an aperture such as a slot in the automobile.

A drawback of commonly used fasteners occurs for certain applications, including fasteners used to mount trim or instrument panels, or for trim components which cover air bags. In the first instance, it is common that access to the space behind the trim or instrument panel is desired, however removal of the entire trim piece or panel may be undesirable due to weight or realignment concerns. For trim member applications covering an air bag, deployment of the air bag often displaces the trim component, however, it is undesirable for the trim component to freely disassociate from the body portion of the automobile. To prevent disassociation, fasteners have been created having two-part assemblies, with one part connected to the vehicle body and the second part connected to the trim component or panel member. These fastener designs commonly include a tether which allows the trim or panel component to displace while preventing disassociation from the first part and therefore from the vehicle body. A drawback of these fastener designs is the tether only loosely retains the trim or panel member which can still result in realignment problems, or inadvertent disconnection of electrical connectors, or the like.

SUMMARY

According to several embodiments of the present invention, a fastener system for use with an air bag has a fastener including a rounded base having a flat portion, and first and second arms oriented transverse to the flat portion. A first set of vehicle panel engagement devices is connected to the fastener proximate to the rounded base. A second set of vehicle panel engagement devices is connected to the fastener spatially separated from both the first set of vehicle panel engagement devices and the rounded base. A vehicle component has a dog-house homogenously connected thereto. The rounded base is slidably received within and engaged with the dog-house to releasably connect the fastener to the vehicle component. The vehicle component is adapted to be displaceable upon deployment of an air bag.

According to further embodiments, a fastener assembly includes a first member having first and second arms each including first and second elongated slots. A second member is slidingly engaged with the first member, the second member having first and second body portions each including first and second tabs extending toward an opposite one of the first and second body portions. A plurality of dimples are created on each of the first and second body portions. The plurality of dimples of the first body portion extend into the first and second elongated slots of the first arm in a first engaged position of the first and second members, and the plurality of dimples of the second body portion extend into the first and second elongated slots of the second arm in the first engaged position. The first and second tabs of the first body portion are slidingly positioned within the first and second elongated slots of the first arm, and the first and second tabs of the second body portion are slidingly positioned within the first and second elongated slots of the second arm.

According to further embodiments, a telescoped second engaged position of the fastener assembly has the first and second tabs of the first body portion each in contact with an end wall of the first and second elongated slots of the first arm, and the first and second tabs of the second body portion each in contact with an end wall of the first and second elongated slots of the second arm. The telescoped second position also has the plurality of dimples of each of the first and second body portions displaced out of the first and second elongated slots of both the first and second members.

According to further embodiments, a fastener system includes a first member having a rounded base having a flat portion and first and second arms oriented transverse to the flat portion. The first and second arms each include first and second elongated slots. A second member is slidingly engaged with the first member. The second member has first and second body portions each including first and second tabs extending toward an opposite one of the first and second body portions. Each of the first and second tabs are slidingly received in one of the first or second slots allowing the second member to slide in a first direction away from the rounded base. A dog-house is homogenously connected to a polymeric member. The dog-house receives and engages the rounded base in a second direction transverse to the first direction.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
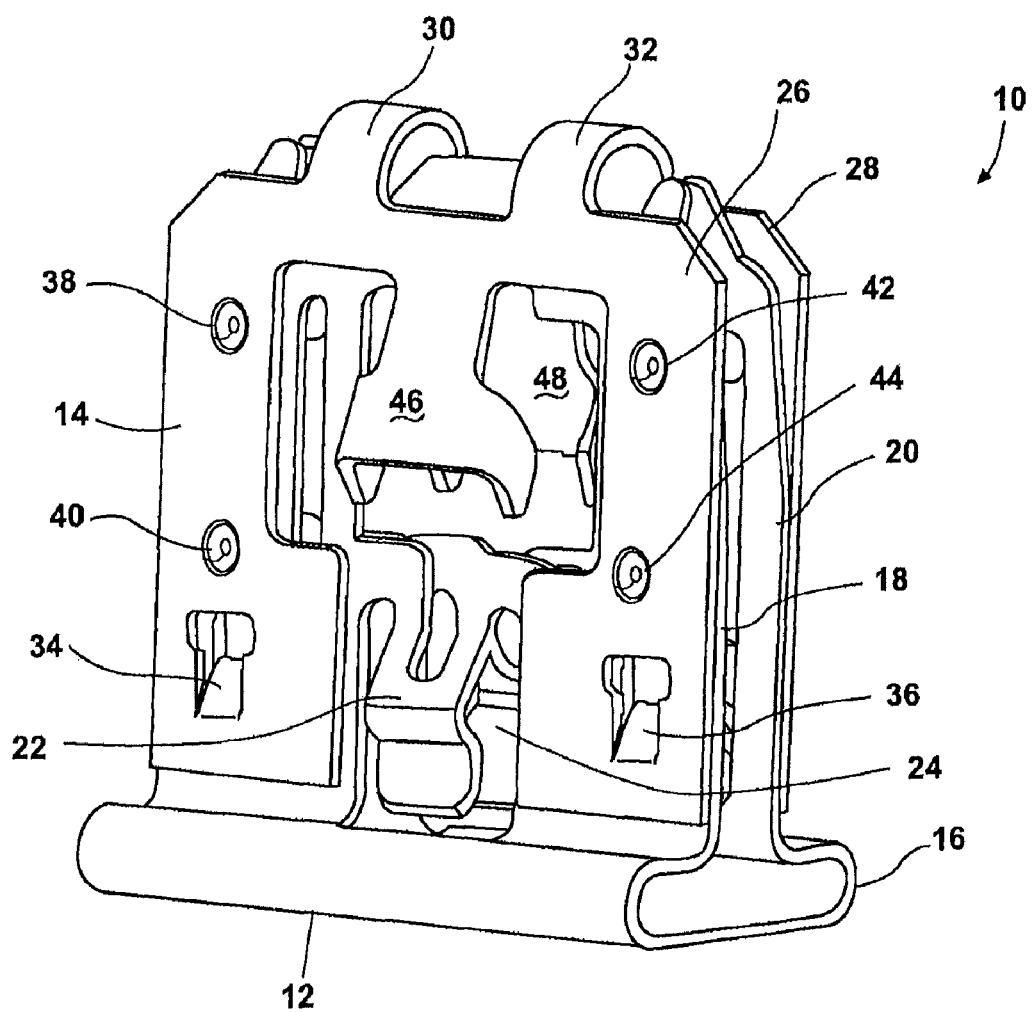
FIG. 1 is front perspective view of a fastener assembly for a two stage, telescoping high retention fastener of the present disclosure.

The following description is merely exemplary in nature and is not intended to limit the present disclosure, application, or uses. It should be understood that throughout the drawings, corresponding reference numerals indicate like or corresponding parts and features.

Referring to FIG. 1, a fastener assembly 10 includes a first member 12 which is releasably and slidably connected to a second member 14. First member 12 includes a rounded base 16 having curved ends extending from a flat portion and substantially parallel, opposed first and second legs 18, 20 extending transversely with respect to the flat portion. First leg 18 includes a first elastically flexible arm 22. Similarly, second leg 20 includes a second elastically flexible arm 24. First leg 18 and first elastically flexible arm 22 are oriented as substantially a mirror image configuration of second leg 20 and second elastically flexible arm 24. First member 12 can be made of a metal such as spring steel, or from other materials including one or more polymeric materials.

Second member 14 defines a U-shape and includes first and second body portions 26, 28 which are connected by first and second joining bands 30, 32. First and second joining bands 30, 32 are homogenous extensions of first and second body portions 26, 28. A first tab 34 and a second tab 36 are homogenous extensions of first body portion 26. First and second tabs 34, 36 are formed by a cutting, piercing, stamping, or similar operation performed on first body portion 26 and bent to extend from first body portion 26 toward second body portion 28. Second body portion 28 also includes each of a first and second tab 34', 36' which are not clearly visible in this view which are mirror images of first and second tabs 34, 36. First body portion 26 also includes each of a first, second, third, and fourth alignment dimple 38, 40, 42, 44. First and third alignment dimples 38, 42 are coaxially aligned with first tab 34. Similarly, third and fourth alignment dimples 42, 44 are coaxially aligned with second tab 36. Second body portion 28 also includes each of a corresponding first, second, third, and fourth alignment dimples 38', 40', 42', 44' which are mirror image copies of first, second, third and fourth alignment dimples 38, 40, 42, 44. Second member 14 can be made of a metal such as spring steel similar to first member 12, or from other materials including one or more polymeric materials.

First body portion 26 further includes a first engagement member 46 which extends to an opposite direction with respect to first and second tabs 34, 36. Similarly, second body portion 28 includes a second engagement member 48 which is a mirror image configuration of first engagement member 46 and similarly extends away from second body portion 28 in an opposite direction with respect to first and second tabs 34', 36'.

Figure 2:
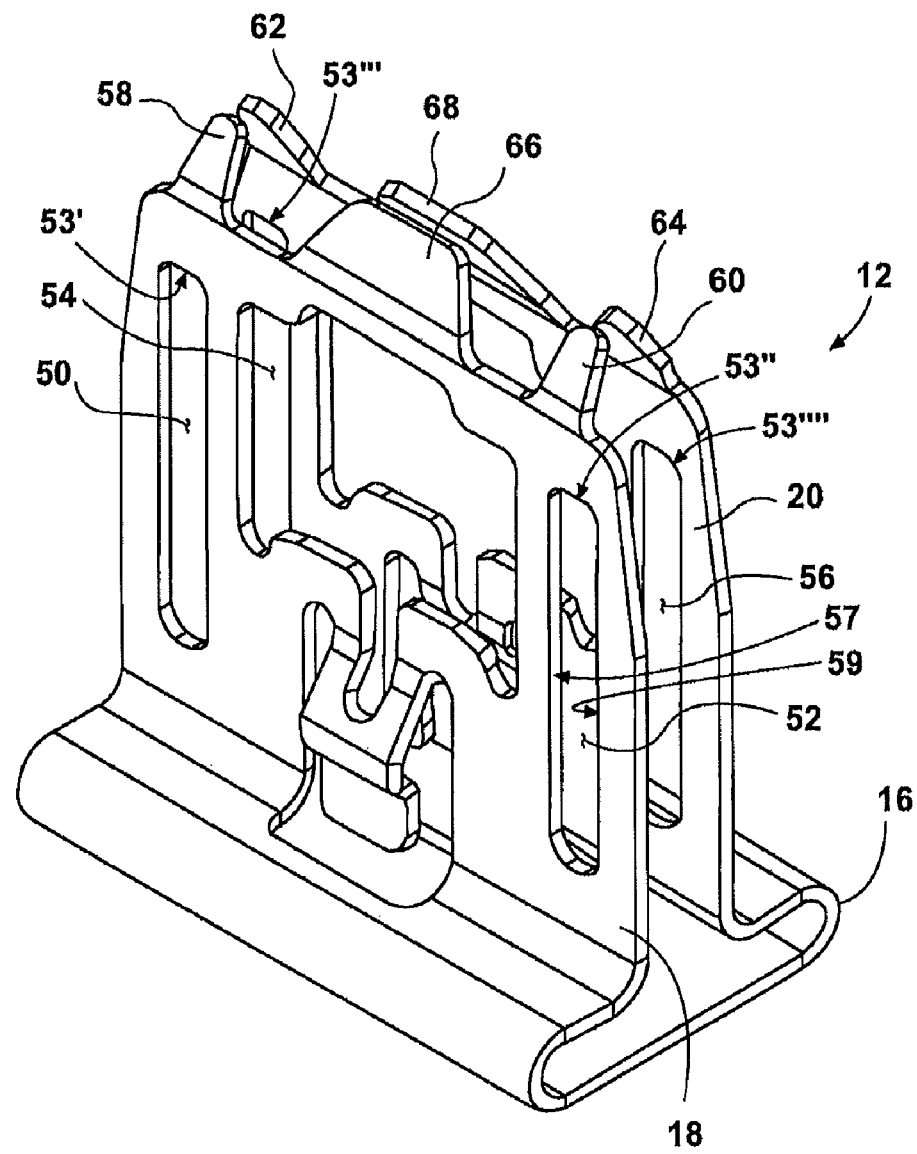
FIG. 2 is front perspective view of a first member of the fastener assembly of FIG. 1.

Referring to FIG. 2, first member 12 further includes parallel first and second elongated tab receiving slots 50, 52. First and second elongated tab receiving slots 50, 52 extend in a direction transverse to rounded base 16 and are each created in first leg 18. Similarly, second leg 20 includes each of a third and fourth elongated tab receiving slot 54, 56 which are mirror image configurations of first and second elongated tab receiving slots 50, 52. The elongated tab receiving slots 50, 52, 54, 56 are closed-ended slots and each include at least an end wall 53', 53'', 53''', 53'''' and opposed side walls 57, 59 respectively. Each of a first and second tab alignment member 58, 60 homogenously extend from a free end of first leg 18. Similarly, each of a third and fourth tab alignment member 62, 64 homogenously extend beyond a free end of second leg 20. First and second tab alignment members 58, 60 are oriented at an angle with respect to first leg 18 and bent toward each of a third and fourth tab alignment member 62, 64 which each homogenously extend from second leg 20 in a mirror image of first and second tab alignment members 58, 60.

Positioned between first and second tab alignment members 58, 60 is a first assembly alignment member 66 which homogenously extends from first leg 18 and is commonly angled with respect to first and second tab alignment members 58, 60. Similarly, a second assembly alignment member 68 is positioned between each of third and fourth tab alignment members 62, 64 homogenously extending from second leg 20, and commonly angled with respect to third and fourth alignment members 62, 64 toward first assembly alignment member 66.

All of the features shown for first member 12 are created from various punching, stamping, bending, or other similar operations performed on a sheet or plate of material such as spring steel or commonly molded from a polymeric material in a single mold operation. Other metal materials or polymeric materials can be substituted for spring steel for either first member 12 or second member 14. Spring steel is selected for several embodiments of the present disclosure to provide a spring or bias force tending to retain first and second legs 18, 20 in the general configuration shown in FIG. 2 during installation or subsequent use of fastener assembly 10.

Figure 5:
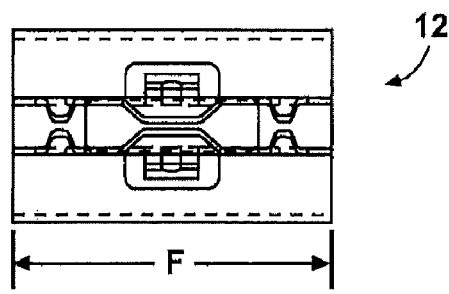
FIG. 5 is a top plan view of the first member of FIG. 2.
Figure 3:
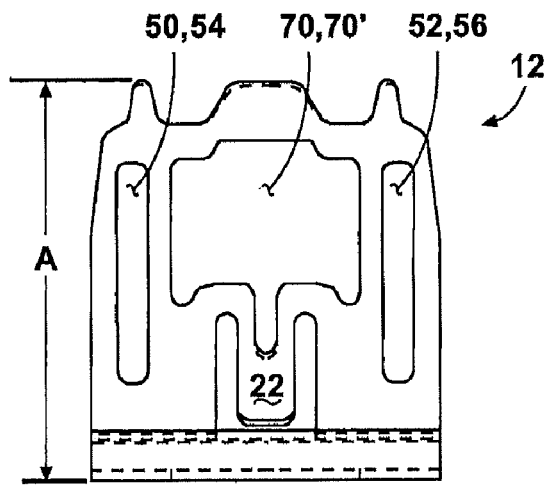
FIG. 3 is a front elevational view of the first member of FIG. 2.
Figure 4:
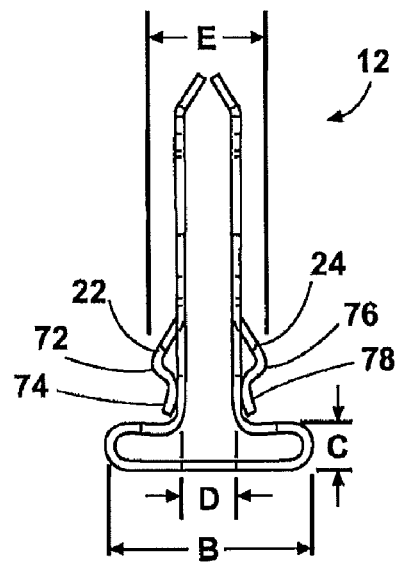
FIG. 4 is a side elevational view of the first member of FIG. 2.

Referring to FIGS. 3-5, first member 12 can also include a cavity 70 created between first and second elongated tab receiving slots 50, 52 of first leg 18. Similarly, first member 12 can also include a cavity 70' created in second leg 20 between third and fourth elongated tab receiving slots 54, 56. First member 12 has a first member height "A", a first member base width "B", a first member base height "C", a leg spacing dimension "D", a flexible arm non-deflected spacing "E", and a first member length "F". According to several embodiments, first member height "A" is approximately 27.0 mm, first member base width "B" can be approximately 14.4 mm, first member base height "C" can be approximately 3.2 mm, leg spacing dimension "D" can be approximately 4.4 mm, and first member length "F" can be approximately 24.0 mm. Flexible arm non-deflected spacing "E" is a distance measurable between each of a first flexible arm convex portion 72 and a second flexible arm convex portion 76. According to several embodiments, flexible arm non-deflected spacing "E" can be approximately 7.8 mm. A first flexible arm concave portion 74 and a second flexible arm concave portion 78 are each created at a free end of first and second flexible arms 22, 24, respectively.

Figure 6:
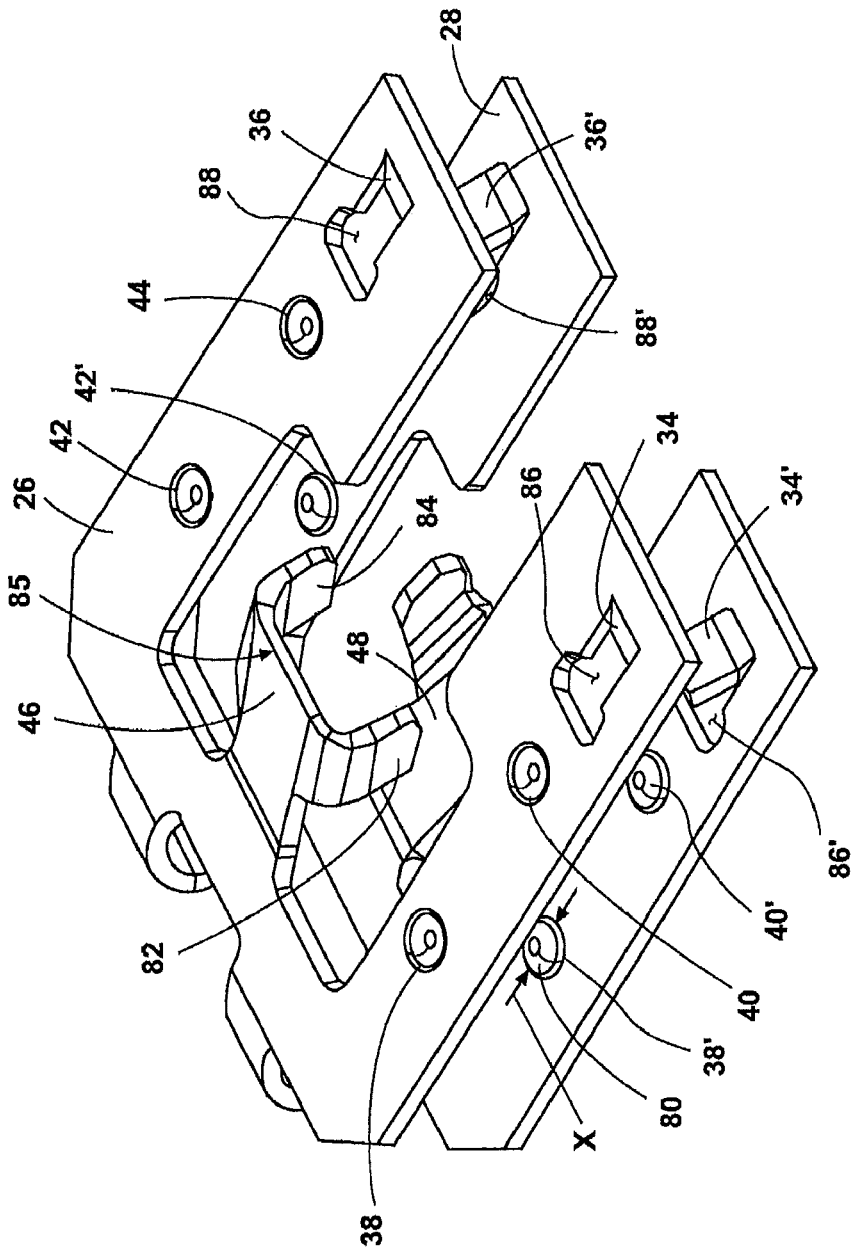
FIG. 6 is front perspective view of a second member of the fastener assembly of FIG. 1.

Referring to FIG. 6 and again to FIG. 2, each of the first, second, third, and fourth alignment dimples 38, 38', 40, 40', 42, 42', 44, 44' are created on outward facing surfaces of first and second body portions 26, 28. A rounded raised surface 80 is therefore created on each of the inward facing surfaces of first and second body portions 26, 28 (i.e.: the surfaces between first and second body portions 26, 28). A diameter "X" of each of the rounded raised surfaces 80 is smaller than a span width of the first, second, third, and fourth elongated tab receiving slots 50, 52, 54, 56 shown and described in reference to FIG. 2. Each of the rounded raised surfaces 80 are therefore intended to fit within the elongated tab receiving slots 50, 52, 54, 56 to help prevent rotation of the second member 14 when second member 14 is engaged with first member 12 to create fastener assembly 10 (described in reference to FIG. 1). Each of the first and second engagement members 46, 48 also include a first engagement wing 82 and an opposed second engagement wing 84 which extend substantially transverse to a planar surface 85. A cavity 86, 86' is created in each of first and second body portions 26, 28 when first tabs 34, 34' are created. Similarly, a cavity 88, 88' is created in each of first and second body portions 26, 28 when second tabs 36, 36' are created.

Figure 7:
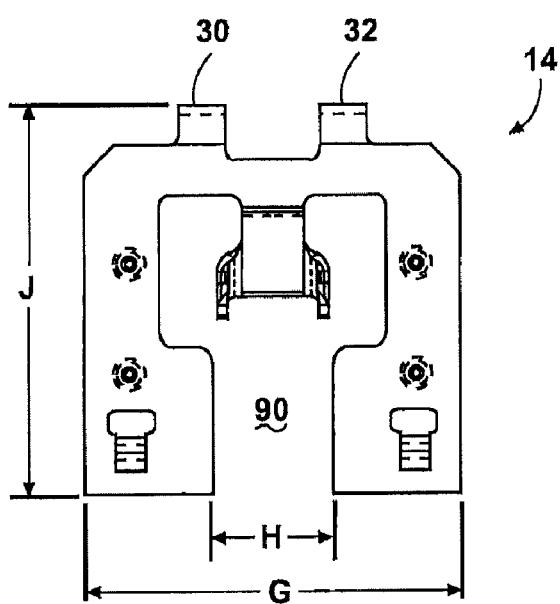
FIG. 7 is a front elevational view of the second member of FIG. 6.
Figure 8:
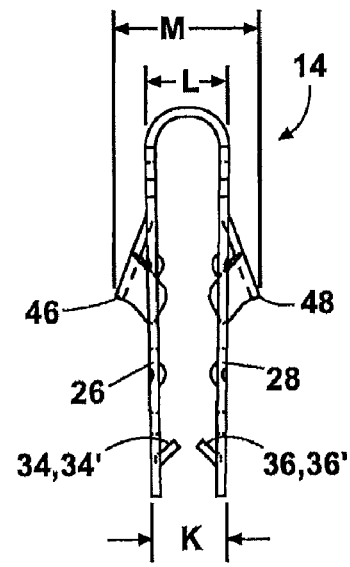
FIG. 8 is a side elevational view of the second member of FIG. 6.

Referring to FIGS. 7-9 and again to FIG. 1, second member 14 has a second member width "G" which is substantially equal to first member length "F" described in reference to FIG. 5. A second member slot 90 has a second member slot width "H" which allows second member 14 to be slidably received on first member 12 allowing clearance for each of the first and second flexible arms 22, 24. Second member 14 also has a second member height "J". According to several embodiments, second member width "G" is approximately 24.0 mm, second member slot width "H" is approximately 8.0 mm, and second member height "J" is approximately 25.6 mm. The dimensions provided herein are for example only and can be modified at the discretion of the manufacturer to suit various sizes and geometries of fastener assemblies 10 of the present disclosure.

First and second tabs 34, 34', 36, 36' are positioned proximate to free ends of each of first and second body portions 26, 28. The free ends of first and second body portions 26, 28 are separated by a first leg spacing dimension "K". The first and second joining bands 30, 32 define a second leg spacing dimension "L". According to several embodiments, first leg spacing dimension "K" is equal to or less than second leg spacing dimension "L" so that as second member 14 is engaged with first member 12 a spring or biasing force is created by temporary separation of first and second body portions 26, 28 which acts to elastically return first and second body portions 26, 28 to the configuration shown in FIG. 8 when first and second tabs 34, 34', 36, 36' engage within the elongated tab receiving slots 50, 52, 54, 56 of first member 12 described in reference to FIG. 2. In the non-deflected state shown in FIG. 8, free ends of first and second engagement members 46, 48 are separated by an engagement member spacing dimension "M". According to several embodiments, first leg spacing dimension "K" is approximately 4.9 mm, second leg spacing dimension "L" is approximately 5.3 mm, and engagement member spacing dimension "M" is approximately 9.3 mm.

Figure 9:
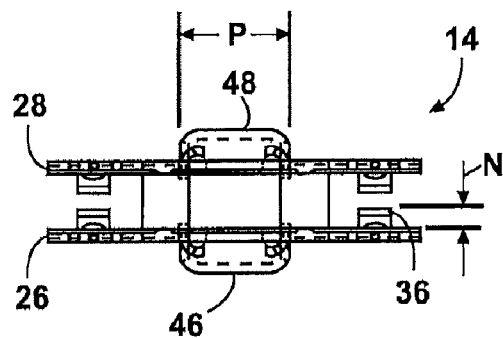
FIG. 9 is a top plan view of the second member of FIG. 6.

Referring more specifically to FIG. 9, a tab extension dimension "N" of second tab 36 is representative of each of the first and second tabs 34, 34', 36, 36' such that each of the first and second tabs 34, 34', 36, 36' extend from first and second body portions 26, 28 by tab extension dimension "N". Both of the first and second engagement members 46, 48 have an engagement member width "P". According to several embodiments, tab extension dimension "N" is approximately 1.5 mm and engagement member width "P" is approximately 7.2 mm.

Figure 10:
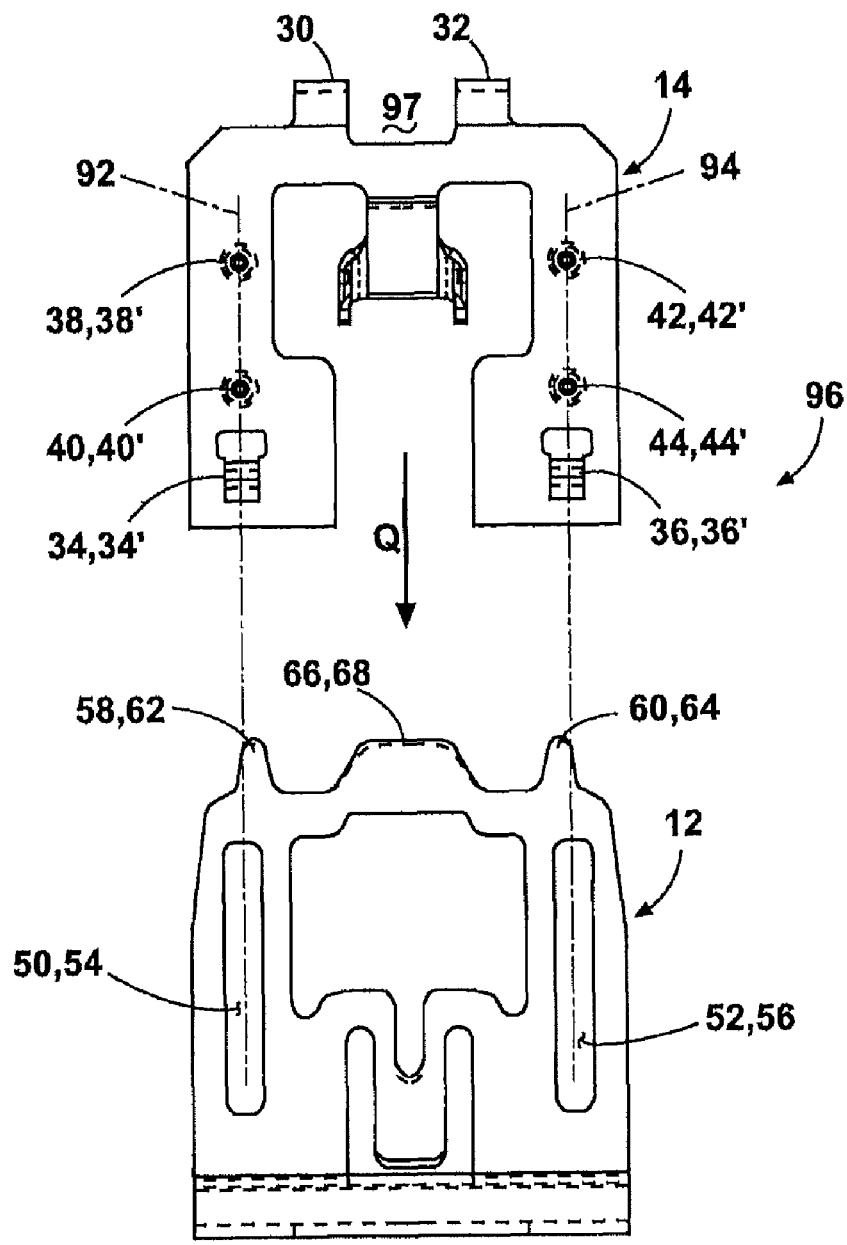
FIG. 10 is a front elevational view showing a pre-assembled condition of the fastener assembly of FIG. 1.
Figure 12:
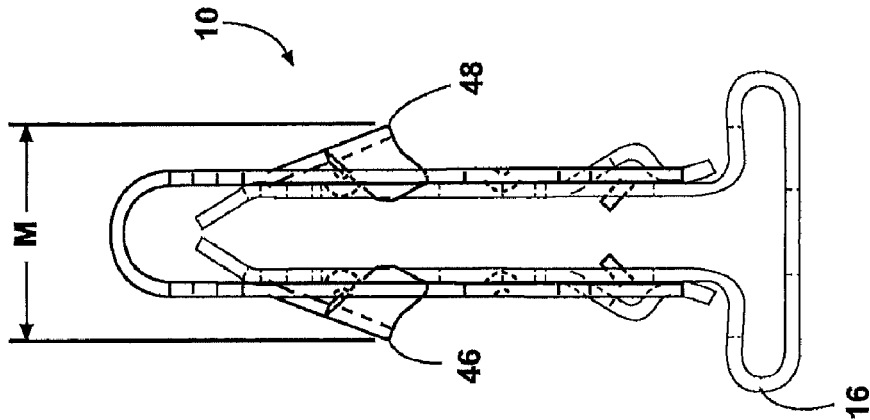
FIG. 12 is a side elevational view of the fastener assembly of FIG. 1.
Figure 11:
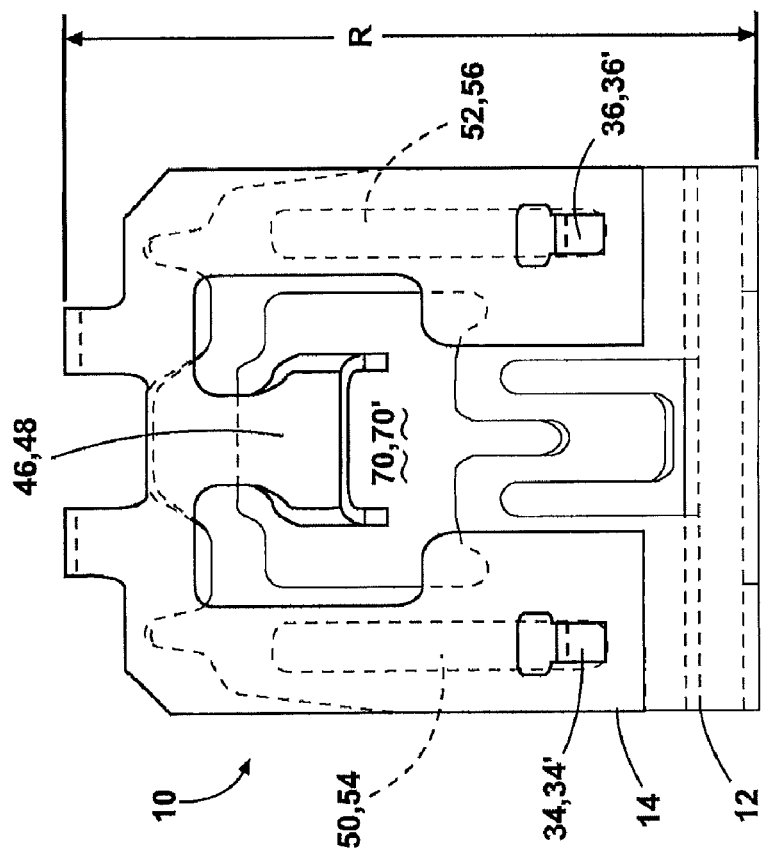
FIG. 11 is a front elevational view of the fastener assembly of FIG. 1.

Referring to FIGS. 10 through 12, second member 14 is shown aligned with but prior to engagement with first member 12. Each of the first tabs 34, 34', the first alignment dimples 38, 38', and the second alignment dimples 40, 40' are coaxially aligned along a first alignment axis defined through a center of both first and third elongated tab receiving slots 50, 54. Similarly, second tabs 36, 36', third alignment dimples 42, 42', and fourth alignment dimples 44, 44' are coaxially aligned with a center of second and fourth elongated tab receiving slots 52, 56. As second member 14 is slidingly engaged with first member 12 in an engagement direction "O", first and second tabs 34, 34' and 36, 36' engage with corresponding ones of the first tab alignment member 58 and third tab alignment member 62, or with second tab alignment member 60 and fourth tab alignment member 64 respectively.

Sliding engagement of the first and second tabs 34, 34', 36, 36' with the tab alignment members 58, 60, 62, 64 elastically deflects first body portion 26 away from second body portion 28 of second member 14 (by bending at first and second joining bands 30, 32) until by continued engagement in engagement direction "Q" the first and second tabs 34, 34', 36, 36' engage within the elongated tab receiving slots 50, 52, 54, 56. Thereafter, each of the first and second tabs 34, 34', 36, 36' can slide within their respective one of the elongated tab receiving slots 50, 52, 54, 56 allowing second member 14 to telescopically slide with respect to first member 12. Continued engagement of second member 14 in engagement direction "Q" positions the alignment dimples 38, 38', 40, 40', 42, 42', 44, 44' in respective ones of the elongated tab receiving slots 50, 52, 54, 56. The alignment dimples 38, 38', 40, 40', 42, 42', 44, 44' thereafter prevent rotation of second member 14 with respect to first member 12. When second member 14 is fully engaged with first member 12, both first and second assembly alignment members 66, 68 are positioned proximate to a cavity 97 created between first and second joining bands 30, 32.

Referring more specifically to FIGS. 11 and 12, in the assembled condition of fastener assembly 10, first and second engagement members 46, 48 are freely deflectable within cavities 70, 70'. Fastener assembly 10 has a fastener assembly height "R" which according to several embodiments of the present disclosure is approximately 30.6 mm.

Figure 13:
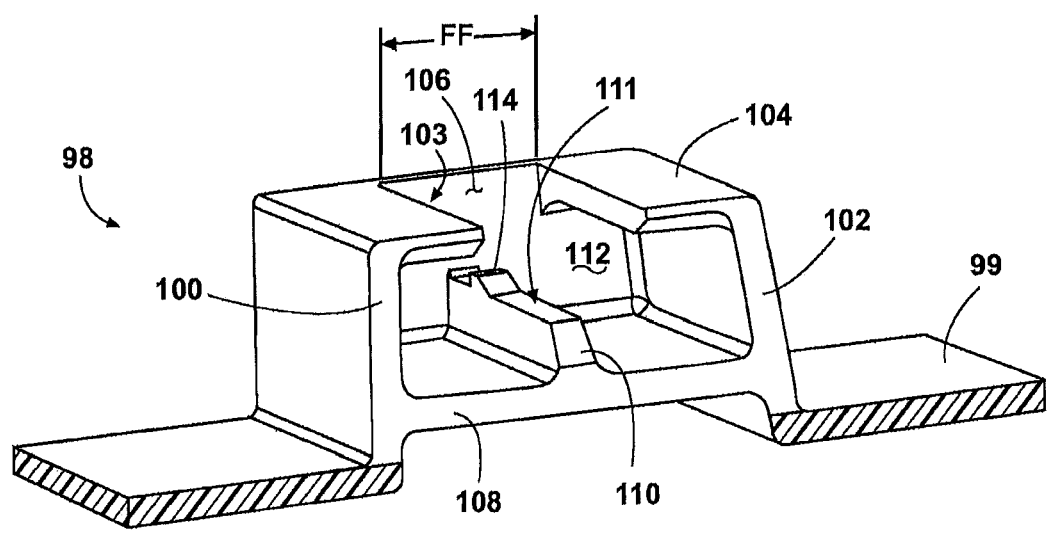
FIG. 13 is a partial cross sectional front perspective view of a dog-house assembly adapted to receive the fastener assembly of FIG. 1.

Referring now to FIG. 13, a dog-house 98 can be homogenously connected to a member 99 such as a trim member adapted for installation on an automobile vehicle. Dog-house 98 is created from a polymeric material which can be co-molded with the member 99. Dog-house 98 includes a first wall 100 and an opposed second wall 102. A rear wall 103 together with first and second walls 100, 102 support an upper wall 104. A slot 106 is created in upper wall 104 so that dog-house 98 can slidably receive fastener assembly 10 (shown in reference to FIG. 15). A lower wall 108 which is substantially parallel to upper wall 104 provides a beam 110 homogenously extending upwardly as viewed in FIG. 13 from lower wall 108 and parallel to slot 106. Beam 110 includes a planar surface 111. First and second walls 100, 102, rear wall 103, upper wall 104, and lower wall 108, together define a cavity 112. An engagement tooth 114 is homogeneously created on surface 111 proximate to rear wall 103 and extends upwardly as viewed in FIG. 13 away from surface 111.

Figure 14:
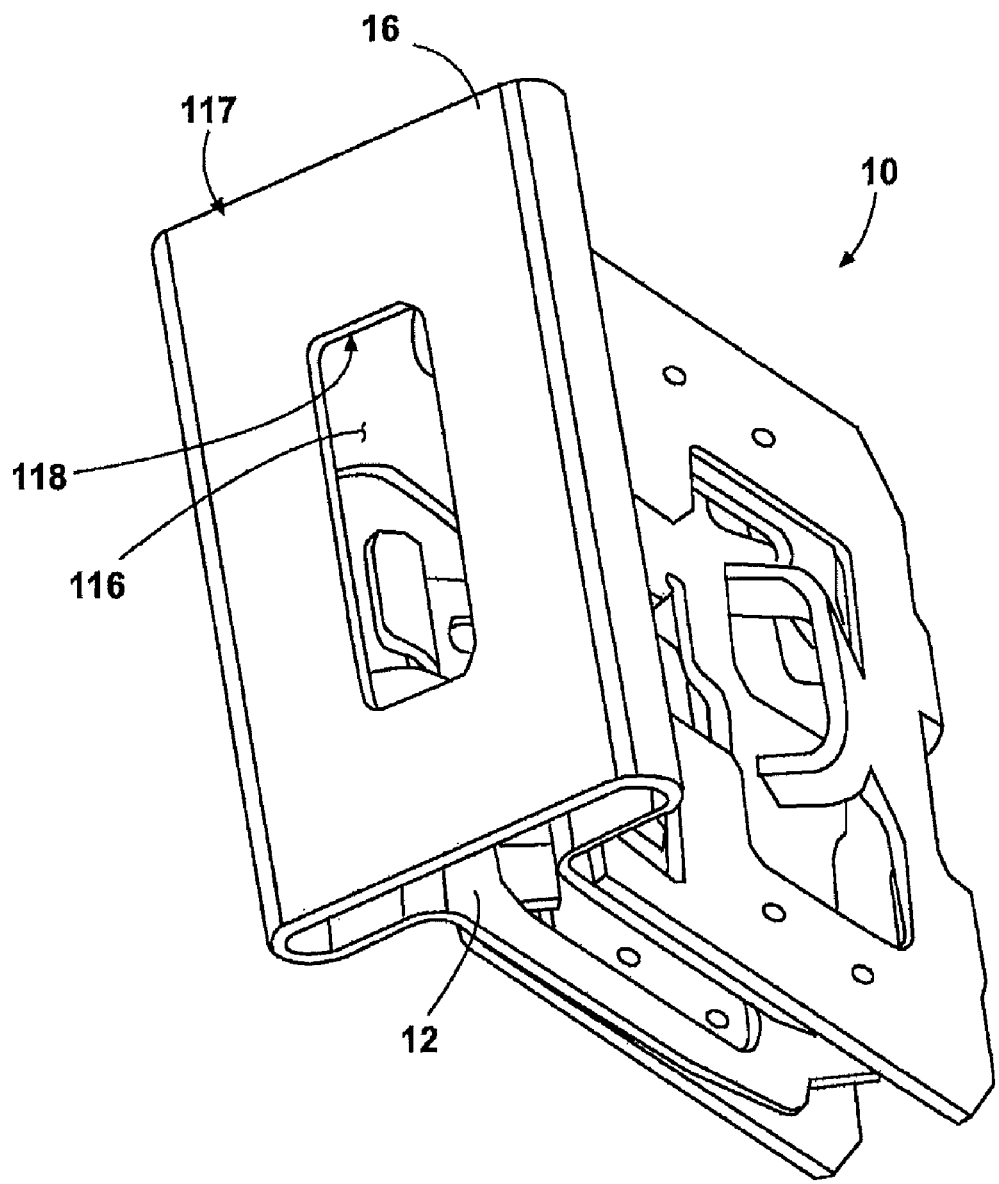
FIG. 14 is a bottom perspective view of the fastener assembly of FIG. 1.

Referring to FIG. 14 and again to FIG. 13, rounded base 16 of first member 12 of fastener assembly 10 includes an elongated slot 116 created in a substantially flat portion 117 of rounded base 16. An edge face 118 defining a first end of elongated slot 116 is provided to engage with the engagement tooth 114 described in reference to FIG. 13 when fastener assembly 10 is slidably inserted into cavity 112 of dog-house 98. The engagement between edge face 118 and engagement tooth 114 provides a positive engagement of fastener assembly 10 within dog-house 98.

Figure 15:
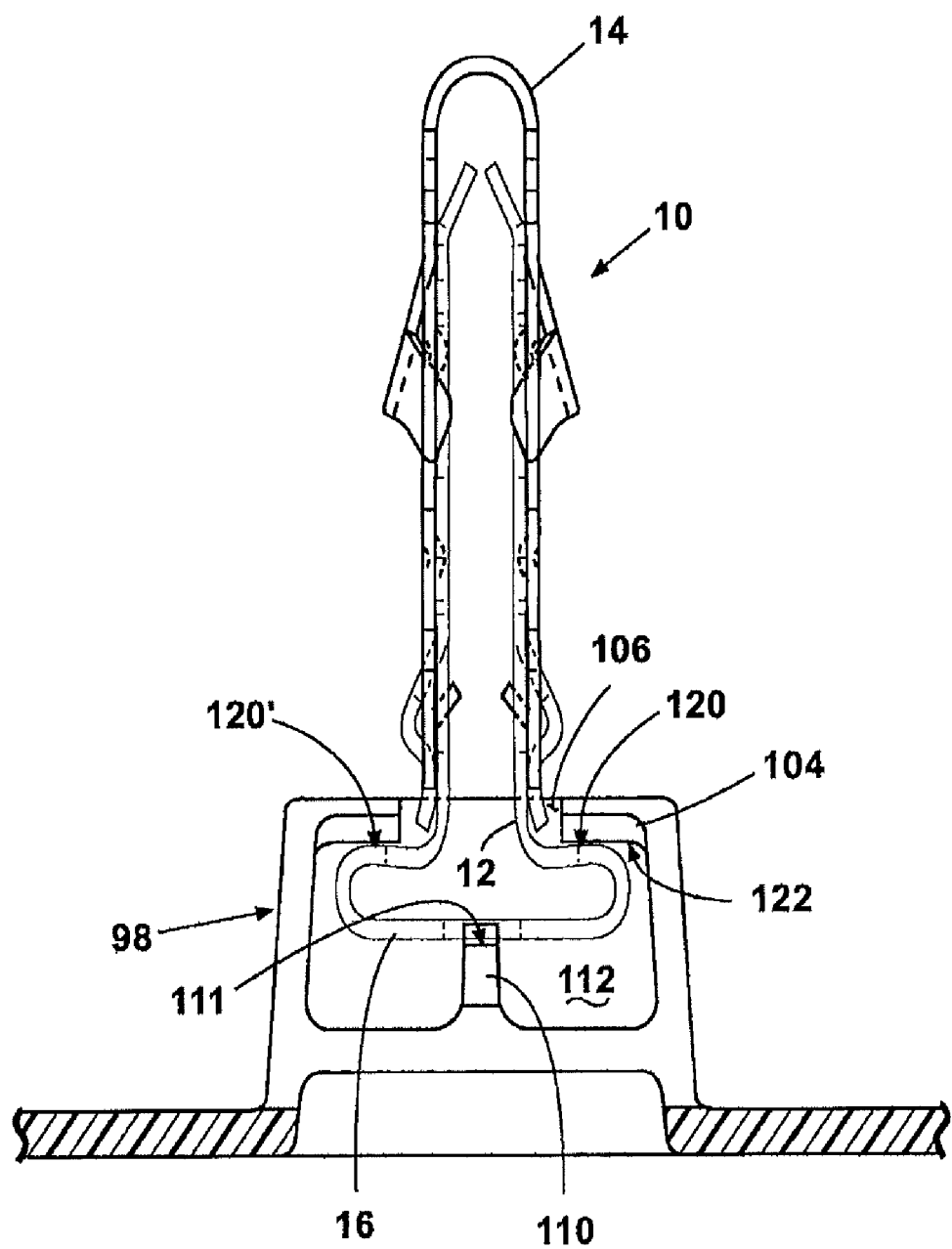
FIG. 15 is a partial cross sectional side elevational view of a sub-assembly of the fastener assembly of FIG. 1 engaged with the dog-house assembly of FIG. 13.

Referring to FIG. 15, fastener assembly 10 is shown following horizontal installation within cavity 112 of dog-house 98. In this position, the lower surface of rounded base 16 is in slidable contact with surface 111 of beam 110. At the same time, an upper surface 120, 120' of rounded base 16 is frictionally engaged with a lower surface 122 of upper wall 104. The remaining portions of fastener assembly 10 extend freely and transversely away from dog-house 98 through slot 106.

Figure 16:
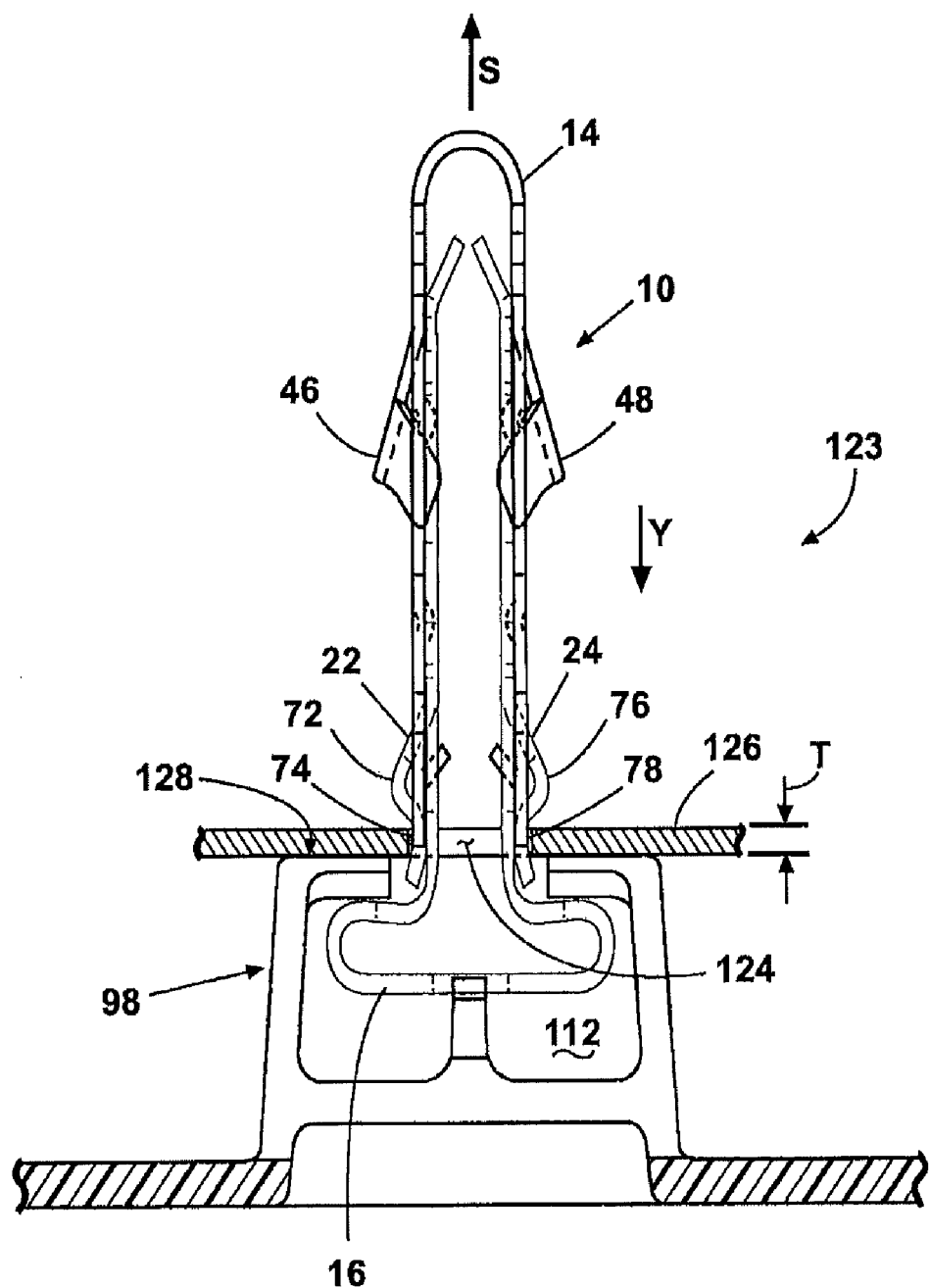
FIG. 16 is a partial cross sectional side elevational view of the fastener sub-assembly of FIG. 15 after engagement with a vehicle body panel.

Referring to FIG. 16, a sub-assembly 123 having fastener assembly 10 engaged with dog-house 98 can be used by inserting fastener assembly 10 starting at second member 14 into a longitudinal slot 124 created in a body panel 126 of an automobile vehicle (not shown). Fastener assembly 10 is inserted in an insertion direction "S" until an upper surface 128 of dog-house 98 contacts body panel 126. First engagement member 46 and second engagement member 48 both elastically deflect toward each other as they are inserted through longitudinal slot 124 then return to their normal extended positions. Subsequently, first and second flexible arms 22, 24 elastically deflect toward each other as first flexible arm convex portion 72 and second flexible arm convex portion 76 pass through longitudinal slot 124. When body panel 126 is in contact with upper surface 128, first and second flexible arms 22, 24 elastically deflect outwardly until first flexible arm concave portion 74 and second flexible arm concave portion 78 individually contact opposed side walls of longitudinal slot 124. First flexible arm concave portion 74 and second flexible arm concave portion 78 are each sized (e.g.: depth and length of curvature) to accommodate a plate thickness "T" of body panel 126. According to several embodiments, plate thickness "T" can range from approximately 0.8 mm to approximately 1.5 mm. This range can be increased or decreased by modifying the geometry of first and second flexible arm concave portions 74, 78. With the sub-assembly 123 of dog-house 98 and fastener assembly 10 in contact with body panel 126, a pull force "Y" of approximately 50 pounds is required to displace dog-house 98 from body panel 126 by overcoming the biasing and static friction forces created by first and second flexible arm concave portions 74, 78.

Figure 17:
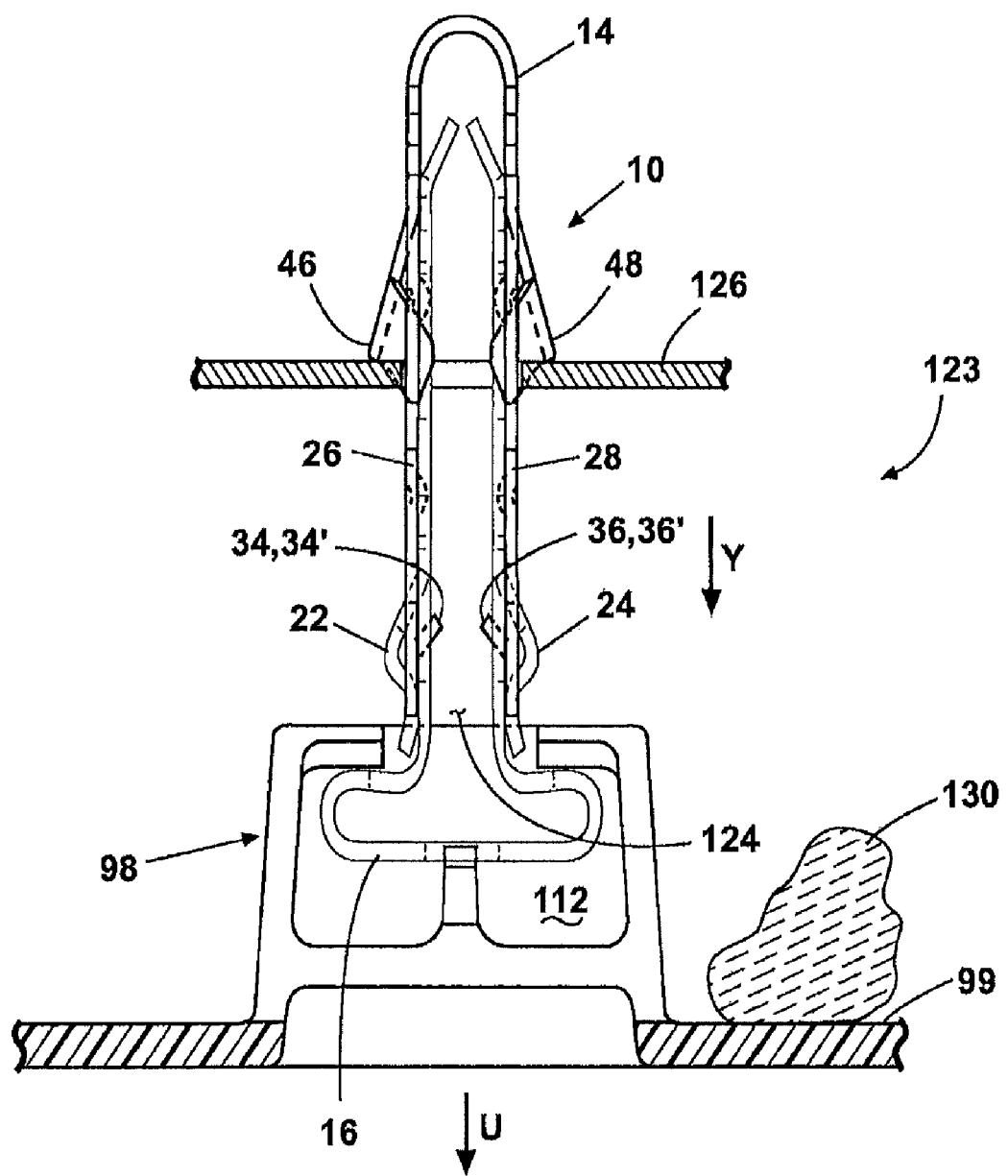
FIG. 17 is a partial cross sectional side elevational view of the fastener subassembly of FIG. 15 after partial displacement away from the vehicle body panel.

Referring to FIG. 17, when the pull force "Y" of approximately 50 pounds has been achieved, for example by expansion or release of an air bag 130 positioned behind or in contact with member 99, separation between sub-assembly 123 having dog-house 98 and fastener assembly 10 can occur with dog-house 98 and member 99 moving in a displacement direction "U" with respect to body panel 126. Displacement in displacement direction "U" continues until body panel 126 contacts first and second engagement members 46, 48. At this time, first member 12 is still in complete engagement with second member 14 such that first and second tabs 34, 34', 36, 36' are positioned proximate to first and second flexible arms 22, 24.

Figure 18:
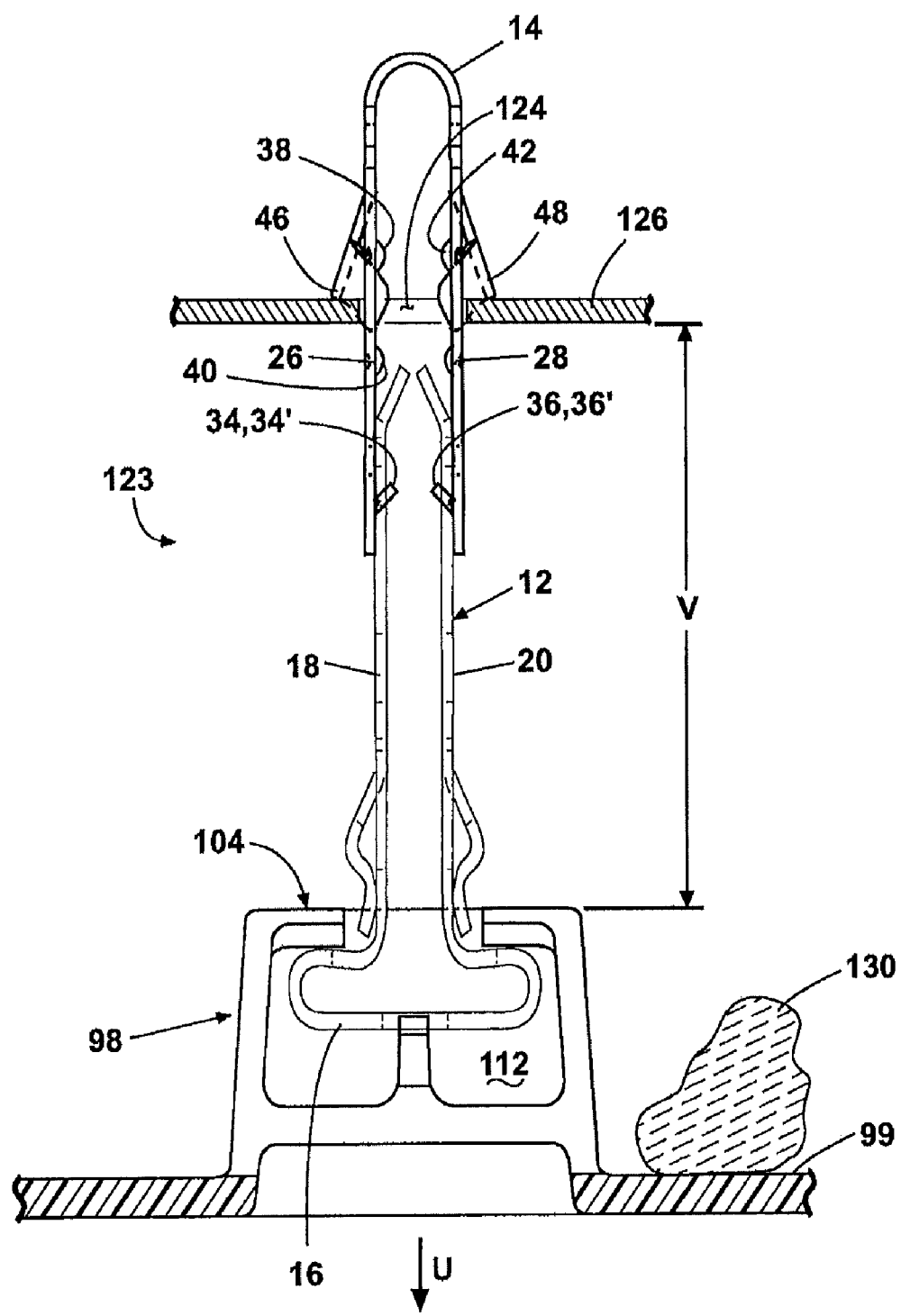
FIG. 18 is a partial cross sectional side elevational view of the fastener subassembly of FIG. 15 after full displacement away from the vehicle body panel.

Referring to FIG. 18, after body panel 126 contacts first and second engagement members 46, 48 further displacement of dog-house 98 in displacement direction "U" causes a sliding displacement between second member 14 and first member 12 with each of the first and second tabs 34, 34', 36, 36' retained in sliding engagement with the elongated tab receiving slots 50, 52, 54, 56 (not visible in this view) of first and second legs 18, 20. Sliding displacement of first member 12 with respect to second member 14 forces first, second, third, and fourth alignment dimples 38, 40, 42, 44 to displace from the elongated tab receiving slots 50, 52, 54, 56 (not visible in this view). Sliding displacement of first member 12 with respect to second member 14 continues until first and second tabs 34, 34', 36, 36' contact the end walls 53', 53", 53'", 53"" of the elongated tab receiving slots 50, 52, 54, 56 (not visible in this view).

At this time, a clearance dimension "V" is provided between body panel 126 and upper wall 104 of dog-house 98. According to several embodiments, clearance dimension "V" can be approximately 24.8 mm. Clearance dimension "V" allows manual access to squeeze together first and second body portions 26, 28 as well as first and second legs 18, 20 with a force to inwardly displace first and second engagement members 46, 48 so that first and second engagement members 46, 48 are drawn toward each other and can be withdrawn through longitudinal slot 124 of body panel 126 to completely remove fastener assembly 10 and dog-house 98 from body panel 126. Clearance dimension "V" can also provide for limited access between member 99 and body panel 126, for example for installation of electrical wires, tubing, and the like.

Figure 21:
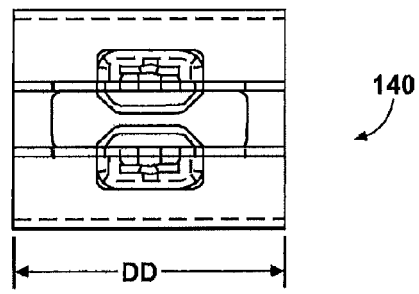
FIG. 21 is a top plan view of the fastener of FIG. 19.
Figure 19:
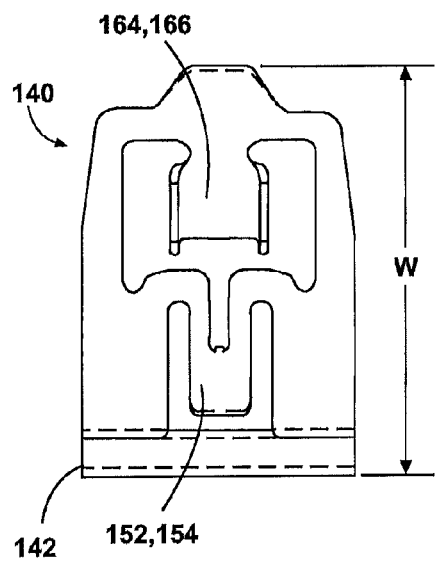
FIG. 19 is a front elevational view of a second embodiment of a fastener of the present disclosure.
Figure 20:
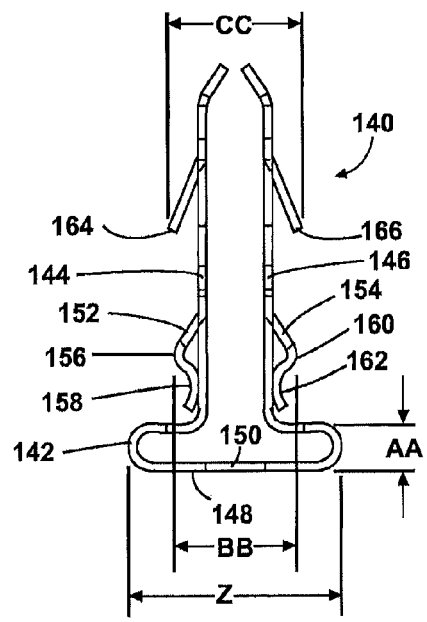
FIG. 20 is a side elevational view of the fastener of FIG. 19.

Referring to FIGS. 19 through 21 and again to FIG. 1, according to additional embodiments a fastener 140 is created as a single piece, homogenously formed member. Fastener 140 includes a rounded base 142 having a flat portion 148 and an elongated aperture 150 similar to rounded base 16, and first and second legs 144, 146 extending substantially transverse to flat portion 148. A first flexible arm 152 homogenously connected to first leg 144 is created and oriented similar to first flexible arm 22, first flexible arm 152 having a first flexible arm convex portion 156 and a first flexible arm concave portion 158. Similarly, a second flexible arm 154 homogenously connected to second leg 146 is created and oriented similar to second flexible arm 24, second flexible arm 154 having a second flexible arm convex portion 160 and a second flexible arm concave portion 162. First and second elastically displaceable engagement members 164, 166 are substantially identical in design and function to first and second engagement members 46, 48, except first and second engagement members 164, 166 are homogenously connected to first and second legs 144, 146 and are not displaceable with respect to rounded base 142.

Fastener 140 has a fastener height "W", a base width "Z", a base height "AA", and a base length "DD". According to several embodiments, fastener height "W", base width "Z", base height "AA", and base length "DD" are substantially equal to first member height "A", first member base width "B", first member base height "C", and first member length "F" respectively, of fastener assembly 10, so that fastener 140 can engage dog-house 98 and provides a similar space envelope for engagement with vehicle body panel 126. Fastener 140 further includes a flexible arm non-deflected spacing dimension "BB", and an engagement arm spacing dimension "CC", which are similar to comparable dimensions of fastener assembly 10.

Figure 22:
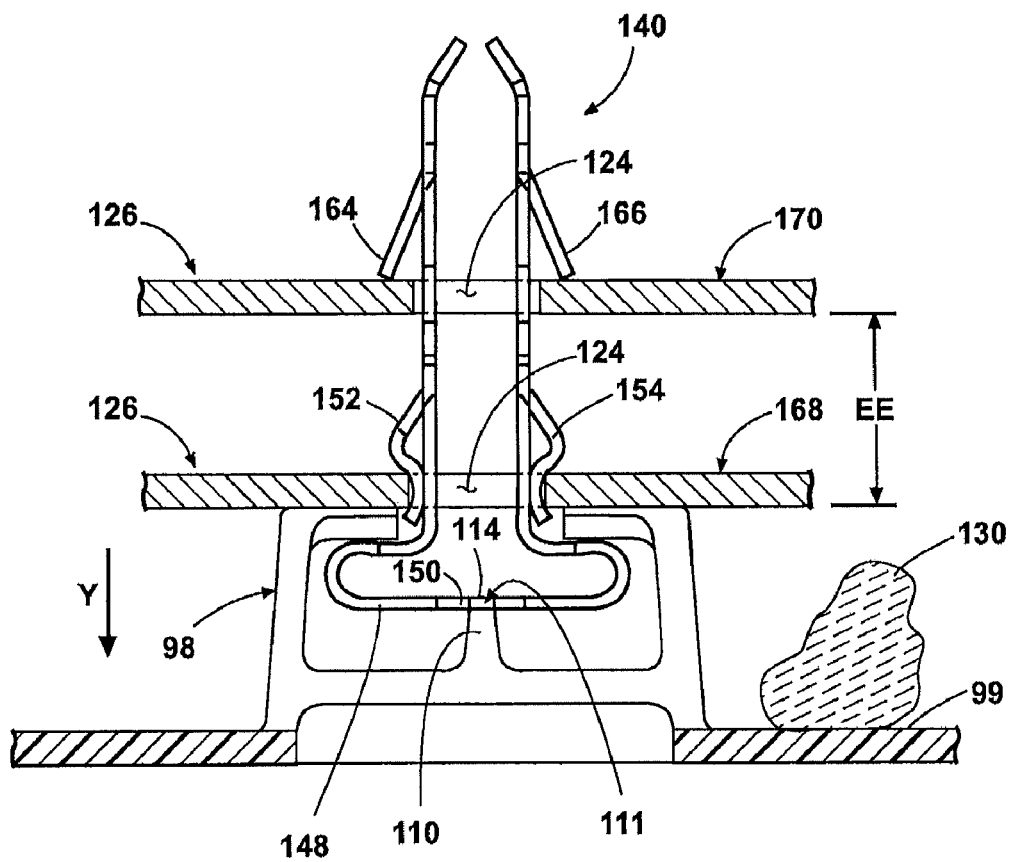
FIG. 22 is a partial cross sectional side elevational view of an assembly of the fastener of FIG. 19 to an automotive vehicle panel.

Referring to FIG. 22 and again to FIGS. 15-18, fastener 140 is engaged within cavity 112 of dog-house 98 in the same manner as fastener assembly 10. An edge face (not shown) of elongated aperture 150 contacts engagement tooth 114 when rounded base 142 is slidably inserted into cavity 112 in a first direction facing away from the viewer as shown in FIG. 22. Similar to fastener assembly 10, fastener 140 is loaded by pulling or forcing displacement of member 99 in a second direction by a force "Y" (downward as viewed in FIG. 22) which is substantially transverse to the first direction for installation of fastener 140 in dog-house 98 described above. First and second flexible arms 152, 154 releasably engage the walls of aperture 124 of vehicle panel 126 in a first engaged position 168 similar to fastener assembly 10. First and second elastically displaceable engagement members 164, 166 contact vehicle body panel 126 in a second engagement position 170 similar to the intermediate engagement position shown in reference to FIG. 17.

Fastener 140 does not provide the telescoping function of fastener assembly 10, therefore a clearance dimension "EE" between first and second engaged positions 168, 170 of vehicle body panel 126 is less than clearance dimension "V" provided by fastener assembly 10. Fastener 140 is also used in applications which can include displacement of vehicle member 99 due to expansion or activation of air bag 130. Similar to fastener assembly 10, a load or force of approximately 50 pounds is also required to displace dog-house 98 from the first engaged position 168 for fastener 140, and a load or force of approximately 200 pounds can be withstood by first and second elastically displaceable engagement members 164, 166 prior to yielding of the material of the engagement members 164, 166.

According to several embodiments, member 99 can support or enclose an air bag assembly (not shown) for an automobile vehicle (not shown). During deployment of the air bag, the fully installed position of fastener assembly 10 in body panel 126 as shown in reference to FIG. 16 will change to the fully extended position shown in reference to FIG. 18 having clearance dimension "V". A high retention capability of fastener assembly 10 is provided as a pull force defined as approximately 200 pounds or greater is required to yield the material of first and second engagement members 46, 48 or the first and second tabs 34, 34', 36, 36'. Therefore, deployment of the air bag will not cause displacement in displacement direction "U" of sub-assembly 123 in excess of clearance dimension "V", thus retaining member 99 in connection with body panel 126.

Referring again to FIGS. 4, 13, 17, 20, and 22, a width "FF" of the slot 106 created in dog-house 98 is adapted to substantially equal or be slightly greater than a spacing between the flexible arm concave portions 74, 78, 158, 162 of fastener assembly 10 and fastener 140, but width "FF" is less than member base width "B" and base width "Z" of fastener assembly 10 and fastener 140. The legs (18, 20) of first member 12, and the second member 14 of fastener assembly 10, and the legs 144, 146 of fastener 140 can therefore extend outward of dog-house 98 through slot 106 of dog-house 98. Width "FF", however, prevents rounded base 16 of fastener assembly 10 or rounded base 142 of fastener 140 from being pulled out of cavity 112 when load "Y" is longitudinally or coaxially applied to the fastener (10, 140) which acts to move the rounded base (16, 142) and the dog-house 98 in displacement direction "U".

Fastener assemblies 10 of the present disclosure offer several advantages. A two-stage telescoping design of fastener assembly 10 provides a normally installed position having fastener assembly 10 fully inserted within a body panel of an automobile vehicle. In a first stage or position, the fastener assembly and dog-house are engaged with a body panel of a vehicle. By pulling with or exerting a force greater than approximately 50 pounds on member 99 tending to pull member 99 away from the body panel 126 of the vehicle, a telescoping or sliding motion of the first and second members 12, 14 of fastener assembly 10 occurs. A frictional sliding displacement is restrained at a second stage or position by contact between first and second tabs 34, 34', 36, 36' of second member 14 contacting end walls of tab receiving slots created in first member 12. The second, displaced position of fastener assembly 10 allows for manual removal of fastener assembly 10 in addition to providing a clearance space between the member 99 and the body panel 126. Dimples created through the first and second body portions 26, 28 of second member 14 which are positioned within the elongated tab receiving slots of first member 12 provide for fastener assembly alignment and prevent rotation of second member 14 with respect to the first member 12.

By frictionally engaging a rounded base of fastener assembly 10 within the dog-house, fastener assembly 10 can be slidably fit into the dog-house in a first or horizontal direction. This engagement position prevents withdrawal of the fastener assembly in a second or longitudinal direction of the fastener assembly which is the direction of load application upon release of an air bag assembly. This connection of the rounded base into or within a cavity of the dog-house improves on fastener designs having bight members within the fastener which externally engage a spade or blade member extending away from a trim member body, but which can release upon application of an air bag deployment load. In the present disclosure, the rounded base can be manually removed from the dog-house by sliding in an opposite direction from the installation direction, but the second direction is still transverse to the load direction applied during air bag deployment. The fastener assembly 10 can also be releasably removed from its second stage engagement with the dog-house by inserting a tool such as a screwdriver into the dog-house and prying the rounded base away from its engagement with the engagement tooth of the dog-house. This provides for complete replacement of fastener assembly 10 and/or complete replacement of member 99.

What is claimed is:
1. A fastener assembly, comprising:
a first member having first and second arms each including first and second elongated slots;
a second member slidingly engaged with the first member, the second member having first and second body portions each including first and second tabs extending toward an opposite one of the first and second body portions; and
a plurality of dimples created on each of the first and second body portions, the plurality of dimples of the first body portion extending into the first and second elongated slots of the first arm in a first engaged position of the first and second members, and the plurality of dimples of the second body portion extending into the first and second elongated slots of the second arm in the first engaged position.

2. The fastener assembly of claim 1, wherein the first and second tabs of the first body portion are slidingly positioned within the first and second elongated slots of the first arm and the first and second tabs of the second body portion are slidingly positioned within the first and second elongated slots of the second arm.

3. The fastener assembly of claim 2, further including a telescoped second engaged position of the fastener assembly having the first and second tabs of the first body portion each in contact with an end wall of the first and second elongated slots of the first arm, and the first and second tabs of the second body portion each in contact with an end wall of the first and second elongated slots of the second arm, the telescoped second position also having the plurality of dimples of each of the first and second body portions displaced out of the first and second elongated slots of both the first and second members.

4. The fastener assembly of claim 1, further including first and second joining bands homogenously joining the first and second body portions such that the second member defines a substantially U-shape.

5. The fastener assembly of claim 4:
wherein the first and second body portions proximate to the first and second joining bands are separated by a first spacing dimension; and
wherein the first and second body portions opposite to the first and second joining bands are separated by a second spacing dimension, the second spacing dimension being less than the first spacing dimension such that contact between the first body portion and the first member and between the second body portion and the second member extends the first and second body portions opposite to the first and second joining bands outwardly to substantially equal the first spacing dimension, creating a biasing force adapted to retain the first and second tabs within the first and second elongated slots.

6. The fastener assembly of claim 1, wherein the plurality of dimples operate to prevent rotation of the second member with respect to the first member by contact between the plurality of dimples and opposed walls of the elongated slots in the first engaged position.

7. The fastener assembly of claim 1, wherein the first and second arms of the first member are parallel to each other and the first arm defines a mirror image of the second arm.

8. The fastener assembly of claim 1, wherein the first member includes a rounded base having a flat portion, the first and second arms being oriented transverse to the flat portion.

9. The fastener assembly of claim 1, further including:
a first flexible arm homogenously connected to the first arm; and
a second flexible arm homogenously connected to the second arm, the second flexible arm defining a mirror image of the first flexible arm.

10. The fastener assembly of claim 1, wherein each of the first and second body portions include tab alignment members each adapted to slidingly contact one of the first and second tabs of individual ones of the first and second body portions to align the first and second tabs with individual ones of the first and second elongated slots when the first and second members are engaged.

11. A fastener system for connection to a vehicle component, comprising:
a fastener including:
a first member having a rounded base having a flat portion and first and second arms oriented transverse to the flat portion, the first and second arms each including first and second elongated slots; and
a second member slidingly engaged with the first member, the second member having first and second body portions each including first and second tabs extending toward an opposite one of the first and second body portions, each of the first and second tabs slidingly received in one of the first or second slots allowing the second member to slide in a first direction away from the rounded base; and
a dog-house homogenously connected to a vehicle component, the dog-house adapted to receive the rounded base in a second direction transverse to the first direction.

12. The fastener system of claim 11, wherein the fastener includes a plurality of dimples created on each of the first and second body portions, and the plurality of dimples of the first body portion extend into the first and second elongated slots of the first arm in a first engaged position of the first and second members, and the plurality of dimples of the second body portion extending into the first and second elongated slots of the second arm in the first engaged position.

13. The fastener system of claim 12, further including a telescoped second engaged position of the first and second members having the first and second tabs of the first body portion each in contact with an end wall of the first and second elongated slots of the first arm, and the first and second tabs of the second body portion each in contact with an end wall of the first and second elongated slots of the second arm.

14. The fastener system of claim 11, further including:
a first flexible arm homogenously connected to the first arm; and
a second flexible arm homogenously connected to the second arm, the first and second flexible arms operable to elastically displace toward and away from each other.

15. The fastener system of claim 14, further including:
a first engagement member homogenously connected to the first body portion and spatially separated from both the first flexible arm and the rounded base; and
a second engagement member homogenously connected to the second body portion and spatially separated from both the second flexible arm and the rounded base, the second engagement member defining a mirror image of the first engagement member.

16. The fastener system of claim 15, further including:
a vehicle body panel having an aperture adapted to receive the fastener; and
an air bag operating to displace the vehicle component from a first fastener engaged position to a second fastener engaged position.

17. The fastener system of claim 16:
wherein in the first fastener engaged position the first and second flexible arms are releasably engaged with the vehicle body panel; and
wherein in the second fastener engaged position the first and second engagement members are engaged with the vehicle body panel.

18. The fastener system of claim 17:
wherein in the first fastener engaged position a force of approximately 50 pounds longitudinally applied to the fastener is required to release the first and second flexible arms from engagement with the vehicle body panel; and
wherein in the second fastener engaged position a second force of approximately 200 pounds longitudinally applied to the fastener is required to yield the first and second engagement members.

19. The fastener system of claim 11:
wherein the fastener includes a plurality of dimples created on each of the first and second body portions, the plurality of dimples positioned within the first and second elongated slots of the first and second arms in a first engaged position of the fastener; and wherein a telescoped second position of the fastener has the plurality of dimples of each of the first and second body portions displaced out of the first and second elongated slots of both the first and second members.

20. The fastener system of claim 11, wherein the first and second tabs slidingly received in one of the first or second slots includes the first and second tabs of the first body portion slidingly positioned within the first and second elongated slots of the first arm and the first and second tabs of the second body portion slidingly positioned within the first and second elongated slots of the second arm.

* * * * *